Patented Dec. 2, 1941

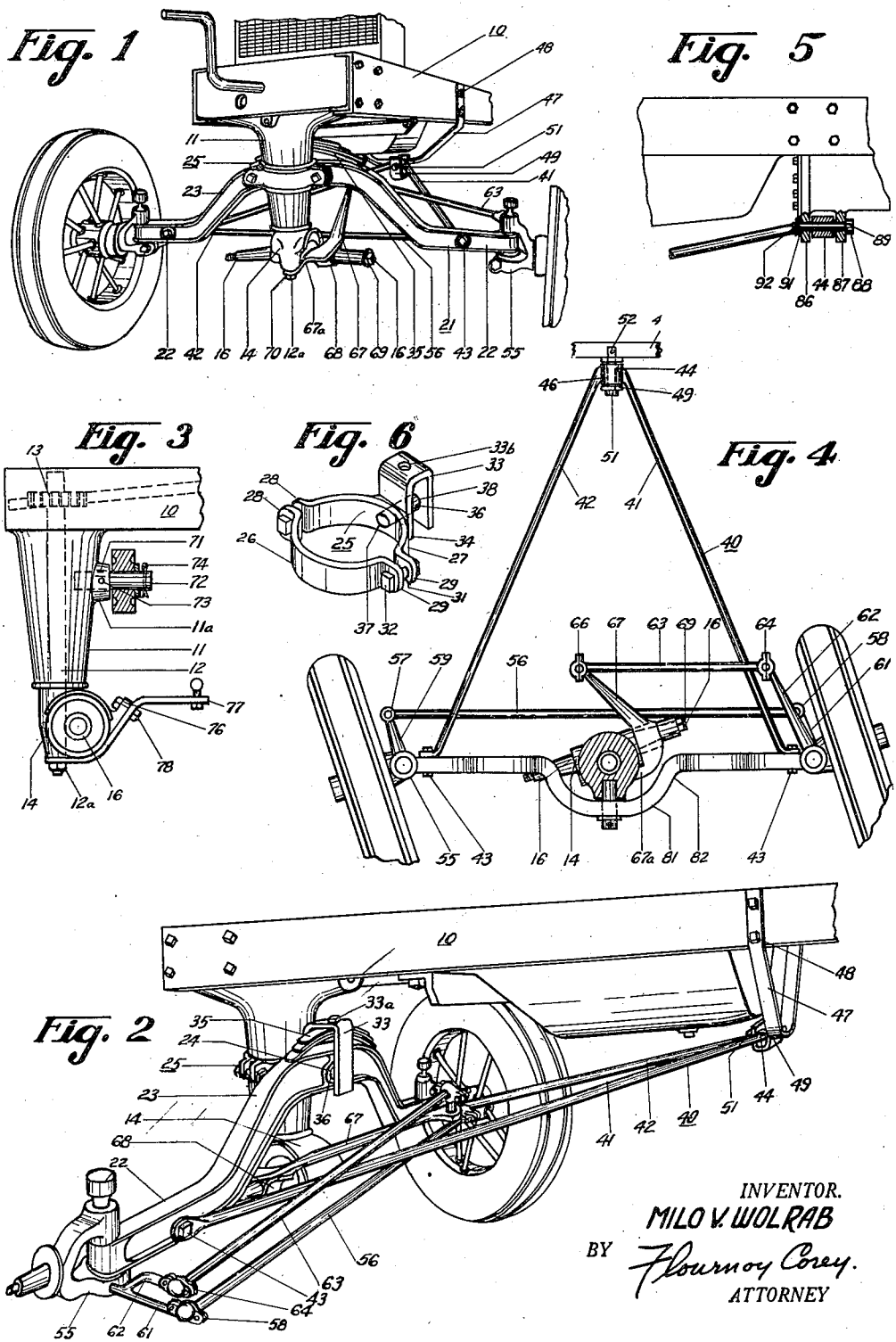

2,264,924

UNITED STATES PATENT OFFICE 2,264,924

TRACTOR

Milo V. Wolrab, Mount Vernon, Iowa

Application April 19, 1939, Serial No. 268,685

12 Claims. (Cl. 280—87)

This invention relates to tractors and particularly to improvements in the construction of front axles for tractors.

The two general types of tractors in common use, namely the conventional type with widely spaced front wheels, and the row crop type, each have their limitations as well as their respective merits and particular uses.

The conventional type of tractor is not very practical for cultivating row crops such as corn, since the front axle is high enough to clear the crop only while it is very young. Before crops such as corn are ready to be "laid by," the stalks are already too high to pass under the front axle of the conventional tractor and the use of such a tractor merely bends over or breaks the young stalks.

The row crop tractor, on the other hand, has both front wheels so located that they both pass between the adjacent rows.

The row crop tractor, however, is generally not very suitable for ordinary plowing since one of the wheels generally rides on the outside of the furrow, making it hard to handle. Furthermore, when a row crop tractor is used in soft or wet ground, dirt tends to ball up on the wheels and clogs between the wheels and the frame. There is ordinarily not a great amount of clearance between the wheels and the frame on such a tractor.

The widely spaced front wheels on the conventional type of tractor permit the front wheels to follow along in the furrows, making the machine considerably easier to handle as well as making it practically impossible to clog the front wheels. This type of tractor is also generally more suitable for belt work since the widely spaced front wheels do not tend to slip and misalign the belt.

It is, therefore, one of the primary objects of the invention to provide a structure having the advantages of both the conventional and the row crop type of tractors.

It is another object of my invention to provide an interchangeable type of structure that may be used on the row crop type of tractor generally in use to convert it for use as a conventional type of tractor.

It is a further object of my invention to provide a device of this type which can be very quickly and easily mounted in place or removed.

It is a still further object of my invention to provide means for controlling or steering such a device through the regular steering mechanism when the tractor is adapted for use either as a conventional type or a row crop type of tractor.

Other and further features and objects of the invention will be more apparent to those skilled in the art upon a consideration of the accompanying drawing and following specifications, wherein are disclosed several exemplary embodiments of the invention, with the understanding, however, that such changes may be made therein as fall within the scope of the appended claims, without departing from the spirit of the invention.

In said drawing:

Figure 1 represents a front view in perspective of a portion of a tractor showing, in particular, the construction of and method of mounting a front axle constructed in accordance with one embodiment of my invention.

Figure 2 is a partial view in perspective of the front end of the tractor illustrated in Figure 1 but as viewed from a different angle.

Figure 3 illustrates a modified method of mounting the front axle upon the tractor.

Figure 4 is a plan view of a device constructed in accordance with another embodiment of my invention.

Figure 5 is a broken-away view in elevation illustrating a modified method of demountably attaching the "wish bone" of my structure to the under body of the tractor, and Figure 6 is a view in perspective of an axle pivot mounting means as constructed in accordance with one embodiment of my invention.

Referring now to the drawing, and to Figures 1 and 2 in particular; the usual row crop type of tractor, the chassis of which is indicated generally at 10, is ordinarily equipped with a front supporting column 11 in which a vertical steering shaft 12 (not shown in Figure 1) is rotatably mounted. This steering shaft is ordinarily rotated by means of a worm and gear drive as shown at 13 in Figure 3. A wheel supporting structure 14 having two spindles 16 extending laterally therefrom is mounted on the lower end of the steering column 12. Wheels having tapered bearings are mounted upon these spindles and held in place by means of nuts and cotter keys or the like.

When adapting such a row crop type of tractor for use as a conventional type tractor with a structure built in accordance with my invention, these wheels are of course removed from the spindles 16.

My invention includes an axle preferably of a shape as indicated generally at 21 having short straight sections or portions 22 near the outer ends thereof and an arched section 23 near the center. The axle is adapted to be pivotally supported on a pin extending through the very center thereof and clamped in place against the front supporting post 11. The clamp adapted to pivotally support the axle on the front post 11 is indicated generally at 25 and shown in detail in Figure 6. The bracket is preferably in the form of a heavy draw band in two parts 26 and 27, each having lugs or ears as at 28 and 29. These ears have openings as shown at 31 to receive draw bolts 32 and nuts to permit the device to be tightly clamped about the post 11. A U-shaped strap member is welded or otherwise fastened to the center portion of one of the parts of the draw band, as shown at 34. A pin 36 is inserted through an opening 37 through both the draw band and the U-shaped strap. The pin is preferably received at its outer end in a recess 38 in the other leg of the U-shaped strap member.

The device is installed on the tractor by placing the U-shaped member 33 over the center portion of the axle and inserting the pin 36 through the opening provided and through an opening 24 in the center of the axle. The draw band is then installed about the post and held tightly in place by the bolts 32. The pin 36 will not fall out as long as the band is held in place on the post.

With this construction, the axle is perfectly free to pivot about the supporting pin and thus permits the front wheels to ride on a steep angle, that is, one considerably higher than the other, without affecting the stability of the tractor.

I may provide a plurality of leaf springs 35 to reduce to some extent the perfect freedom for pivotal movement had by a construction as described. These leaf springs may be attached by means such as a bolt 33a extending through an opening in the center of the spring leaf and an opening 33b in the U member 33. The outer ends of the leaf springs bear against the top surface of the arch of the axle. Since the springs are held in fixed relation to the post 11 they tend to resist the pivotal movement of the axle and absorb shocks.

The axle is reinforced by means of a wishbone indicated generally at 40, which holds the axle at right angles to the main frame of the vehicle. The wishbone also takes up the twisting strains which would otherwise be borne by the pin 36. The wishbone includes two rods 41 and 42 attached by bolts as at 43 to the axle near its outer ends. These rods extend rearwardly, converging one toward the other, and terminate in a collar 44. An opening 46 extending through this collar is preferably made substantially in alignment with the front axle supporting pin 36.

A strap member 47 supported from the main frame of the tractor, as at 48, has a U-shaped member 49 attached to it at a point below the center of the vehicle. The member 49 may be attached to the strap member by welding or any other suitable means.

The collar 44 of the wishbone is received within the U-shaped member, and a pin or bolt 51 inserted through an opening extending through both sides of the U-member and also through the collar itself. A nut or a cotter key, as shown at 52, serves to hold the pin in its position.

The front axle is of course provided with wheel spindles suitably supported for turning movement on spindle bolts or pins in accordance with usual practice, and as shown at 55.

The two wheel spindles are tied together by a tie rod 56 which is pivotally connected as at 57 and 58 to arms 59 and 61 extending rearwardly from the wheel spindles.

An auxiliary steering arm 62 is also attached to one of the wheel spindles and is adapted to be moved by means of a link 63 which is connected by means of a pivotal or universal joint, as at 64, to the arm 62. The link 63 is pivotally attached at a point 66 to a lever arm 67. This arm is demountably attached to the member 14 which is ordinarily used for supporting the wheels in a row crop type of tractor.

The arm 67 is formed so as to extend directly to the rear of the supporting column when the spindles 16 extend at right angles to the frame of the tractor. A sleeve member 68 welded or otherwise fastened to the bottom of the arm 67 is adapted to be received over one of the wheel spindles 16 upon which it is held rigidly in place by means of a nut and collar indicated at 69. The outermost end of the arm 67 is preferably formed as at 67a to extend downwardly below the steering post 12. The end of this portion 67a of the arm is supplied with an opening 70 to permit it to be received on the steering post 12 and be held in place by means of the nut 12a at the bottom of the post.

The method of using this front axle structure is both simple and apparent. The front wheels of the row crop tractor are removed, the wheels being placed on the spindles at the ends of the auxiliary axle. The axle supporting clamp 25, after being pinned to the axle, is clamped about the upright post 11 of the tractor and the collar 44 of the wishbone is dropped into place in the U-shaped member 49 and held in place by means of the pin 51. The steering arm 67 is then rigidly attached to the lower end of the steering post as described.

This construction permits the steering apparatus of an auxiliary front axle, such as I have described, to be operated directly through the ordinary steering apparatus of the tractor.

Such a structure as I have disclosed makes it possible to interchange one type of front wheel structure for another type with a minimum of effort and loss of time.

I have illustrated in Figure 3 a modified form of a structure for supporting a front axle upon the upright column 11. The column is provided with a boss 11a extending either to the rear or to the front thereof. This boss and the column is bored, as at 71, to receive a pin 72, the pin being locked in place by means such as a key or tapered pin 73. The front axle is received over the pin 72 in the same manner as it is received on the pin 36 of the structure shown in Figure 6, and may be held in place on the pin by means of a cotter key and washer 74.

The row cropper front wheel supporting member 14 may be provided with a boss or lip 76 extending rearwardly therefrom to permit the steering arm 67 to be attached directly to the wheel supporting head rather than on one of the wheel spindles. The steering arm shown in Figure 3 is attached at one end to the steering post 12 by means of a nut 12a in the same manner as the modification shown in Figure 1. The steering arm is then, however, bent to conform with the lower surface of the wheel supporting head 14 and attached as at 78 by means of a bolt passing through holes in the lip 76 and in the arm.

The front axle may also be formed as shown in Figure 4. In this modification the axle is formed or arched as at 23 in Figure 1, but is also curved outwardly at the upper portion of the arch as shown at 81. This type of axle may of course be pivotally mounted by either of the methods previously shown and described.

The front axle, when formed in this manner, partially encircling the front supporting post tends, due to its shape, to limit the angular distance through which the front axle may move. It is convenient to permit a considerable amount of movement in this part, but it is also desirable that the movement be limited. The curved portion 82 of the axle will come to rest against the upper portion of the front supporting post 11 when the axle has been tilted to a considerable extent and thus tends to prevent the over-burdening of the front end.

A modified form of structure for supporting the rear end of the wishbone is shown in Figure 5. Lugs, or projections 86 and 87 may be formed integral with the lower surface of the tractor, as for instance the transmission case, the collar 44 of the wishbone being adapted to be slid upwardly between the depending projections. A pin or bolt 88 is inserted through openings 89 and 91 in the projections and through the opening 46 in the collar member, to thus support the rear end of the wishbone in its proper position and yet permit pivotal movement. Pin 88 may be held in place by any suitable means such as the cotter pin and washer 92.

It is considered within the scope of this invention to provide the front axle with leaf spring supporting members. This may be done by attaching the ends of the leaf springs to spring shackles which may in turn be pivotally attached to the axle near the ends thereof. The spring may be pivotally supported at its center in the same manner as the axle disclosed herein.

Although I have described several specific embodiments of my invention, it is apparent that modifications thereof may be made by those skilled in the art. Such modifications may be made without departing from the spirit and scope of my invention as set forth in the appended claims.

I claim as my invention:

1. In a tractor having a single wheel-supporting post at the forward end thereof, a means for supporting an auxiliary axle comprising a boss cast integral with the supporting post and extending longitudinally of the tractor, a pivot pin received in an opening in the boss, and other means for retaining the pivot pin in the bore, the axle having an opening through the center thereof adapted to fit over the pivot pin, and means to hold the axle in place on the pin.

2. For use in a row crop type of tractor having a single forward supporting post, a steering shaft therein, and a wheel supporting head at the lower end thereof, an auxiliary steering arm, means for mounting same on the wheel supporting head comprising a lug extending rearwardly from the wheel supporting head, and a bolt passing through an opening in the lug and through an opening in the steering arm, one end of said steering arm having a hole therethrough adapted to be received over the lower end of the steering shaft.

3. For use in a row crop type of tractor having a single wheel supporting post at the front end thereof, a means for supporting an auxiliary axle comprising a pivot pin adapted for insertion through an opening in the axle, a means for supporting the pivot pin in fixed relation to the wheel supporting post of the tractor comprising a draw band adapted to be clamped about the supporting post, a U-shaped strap member attached to the draw band, the draw band and the U-shaped member having openings therethrough to permit the pivot pin to be inserted before the band is clamped about the supporting post.

4. For use in a tractor of the row crop type having a single, front wheel supporting post, an auxiliary axle curved outwardly at the center thereof, and means for pivotally mounting the axle at the center thereof on the supporting post of the tractor, said curved portion of the axle adapted to partially encircle the post, the ends of the curved portion adapted to come to rest against the supporting post when the axle is pivoted about its pivotal means beyond a desired point.

5. In a means for converting a row-crop tractor to a conventional tractor, an arched axle, means for pivotally mounting the arched portion of the axle on the front wheel pedestal at a point intermediate the length of the pedestal, whereby the horizontal plane of the wheel spindles in the conversion structure is at substantially the same level as the wheel spindles of the row-crop structure, and whereby the pivotal point of attachment of the axle to the pedestal is well above the horizontal plane passing through the spindles and the axle is rotated at a position well up on the pedestal to thus afford greatest strength to the mounting and stability to the tractor, and means for steering of the conversion structure including an arm and a collar adapted to be engaged on one of the wheel spindles of the row-crop structure.

6. In a tractor having a front wheel pedestal and means including wheel spindles mounted at the base of the pedestal for steering the tractor, an auxiliary wheel axle with wheel spindles at the ends thereof, means for pivotally mounting said axle near the forward end of the tractor, and means for controlling the wheel spindles on the axle, said controlling means including an arm on at least one of the spindles, a second arm, link means for connecting the second arm to the arm on the wheel spindle on the axle, means comprising part of the second arm and having an opening therethrough engageable over at least one of the spindles at the base of the pedestal, and means for securing the said second arm in place on the said spindle.

7. In a tractor having a front wheel pedestal, a steering shaft therein, wheel spindles mounted at the bottom thereof, an auxiliary axle and means for mounting wheels thereon, means for steering the last mentioned wheel mounting means comprising a steering arm adapted to extend outwardly away from the front wheel pedestal, a portion of the steering arm having an opening therethrough adapted to be received over one of the wheel spindles at the bottom of the pedestal, and a laterally projecting extension of the steering arm having an opening therethrough adapted to be received over the bottom end of the steering shaft.

8. For use in a row crop tractor having a front wheel pedestal, means for supporting an auxiliary axle comprising a pivot pin adapted for insertion through a hole in the axle, a U shaped strap member adapted to be received over the axle and having an opening in at least one leg thereof for receiving the pivot pin, means for demountably clamping the U shaped strap member to the front wheel pedestal, and means for retaining the pivot pin in position in the openings in the U shaped strap and the axle.

9. In a means for converting a row crop tractor having a front wheel pedestal to a conventional tractor, an axle having wheel spindles, the ends of the axle adjacent the wheel spindles being substantially straight and in line with each other, the central portion of the axle being upwardly arched, and means for pivotally mounting the arched portion of the axle on the front wheel pedestal at a point intermediate the length of and on the side of the pedestal, whereby the horizontal plane of the wheel spindles in the conversion structure is at substantially the same level as the wheel spindles of the row crop structure, and whereby the pivotal point of attachment of the axle to the pedestal is well above the horizontal plane passing through the spindles and the axle is rotated at a position well up on the pedestal to thus afford greatest strength to the mounting and greatest stability to the tractor.

10. A conversion axle for row crop tractors in which the guiding wheels are mounted on an approximately cylindrical pedestal, said conversion means including an arched axle having spindles mounted on the ends thereof, and means for pivotally engaging the central portion of the arched axle to the pedestal at a point intermediate its length comprising a pivot secured to the side of the pedestal, whereby the horizontal plane of the wheel spindles and conversion structure is of substantially the same level as the wheel spindles of the row crop structure, and whereby the pivotal point of attachment of the axle to the pedestal is well above the horizontal plane passing through the spindles and the axle is pivoted at a position well up on the pedestal to thus afford greater strength to the mounting and greater stability to the tractor.

11. In a conversion axle structure for row crop tractors having a pedestal column for the support of the tractor on the conventional row crop front wheels, an arched front axle, and means pivotally securing the front axle on the side of the pedestal column at a point intermediate its length, whereby the arch of the axle locates the wheels in substantially the same horizontal plane the row crop front wheels occupied and yet pivotally attaches the axle to the column at a point well up on the column so that the row crop steering mechanism may be free for use in steering.

12. In a conversion axle structure for row crop tractors having a pedestal column for the support of the tractor on the conventional row crop front wheels, an arched front axle, and means pivotally securing the front axle on the side of the pedestal column at a point intermediate its length, whereby the arch of the axle locates the wheels in substantially the same horizontal plane the row crop front wheels occupied and yet pivotally attaches the axle to the column at a point well up on the column so that the row crop steering mechanism may be free for use in steering, and means including arms and a link for employing the spindles of the row crop steering wheels for steering the conversion wheels.

MILO V. WOLRAB.